United States Patent
Jung et al.

(10) Patent No.: US 9,277,459 B2
(45) Date of Patent: Mar. 1, 2016

(54) METHOD FOR REPORTING IN WIRELESS COMMUNICATION SYSTEM AND APPARATUS FOR SUPPORTING SAME

(75) Inventors: Sung Hoon Jung, Anyang-si (KR); Young Dae Lee, Anyang-si (KR); Sung Duck Chun, Anyang-si (KR); Sung Jun Park, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 14/232,576

(22) PCT Filed: Jul. 13, 2012

(86) PCT No.: PCT/KR2012/005580
§ 371 (c)(1),
(2), (4) Date: Jan. 13, 2014

(87) PCT Pub. No.: WO2013/009127
PCT Pub. Date: Jan. 17, 2013

(65) Prior Publication Data
US 2014/0148146 A1    May 29, 2014

Related U.S. Application Data

(60) Provisional application No. 61/507,606, filed on Jul. 14, 2011.

(51) Int. Cl.
*H04M 3/00* (2006.01)
*H04B 17/00* (2015.01)
(Continued)

(52) U.S. Cl.
CPC .......... *H04W 36/0016* (2013.01); *H04W 24/10* (2013.01); *H04W 36/0061* (2013.01); *H04W 36/0094* (2013.01); *H04W 84/045* (2013.01)

(58) Field of Classification Search
None
See application file for complete search history.

(56) References Cited

U.S. PATENT DOCUMENTS

2010/0323633 A1* 12/2010 Pani et al. ................. 455/67.14
2013/0171995 A1*  7/2013 Fujishiro et al. ............ 455/441

FOREIGN PATENT DOCUMENTS

KR    1020040079661    9/2004
KR    1020050119055    12/2005
(Continued)

OTHER PUBLICATIONS

LG Electronics Inc., "Intra-frequency CSG inbound handover for UMTS," 3GPP TSG-RAN2 Meeting #68bis, R2-100458, Jan. 2010, 3 pages.
(Continued)

*Primary Examiner* — Erika A Washington
(74) *Attorney, Agent, or Firm* — Lee, Hong, Degerman, Kang & Waimey

(57) ABSTRACT

A method for reporting in a wireless system, according to one embodiment, is provided. The method comprises: receiving a measurement setting from a serving cell, wherein the measurement setting comprises a system information report indicator for indicating a system information report of a cell to which a measurement result is reported; deciding whether a report condition is satisfied based on the measurement setting; and transmitting to the serving cell a measurement report message comprising the measurement result of the cell to which the result is reported, which satisfied the report condition. The measurement report message further comprises system information of the cell to which the report is made.

18 Claims, 20 Drawing Sheets

(51) Int. Cl.
*H04W 24/00* (2009.01)
*H04W 36/00* (2009.01)
*H04W 24/10* (2009.01)
*H04W 84/04* (2009.01)

(56) References Cited

FOREIGN PATENT DOCUMENTS

| KR | 1020100050339 | 5/2010 |
|---|---|---|
| KR | 1020100100017 | 9/2010 |
| WO | 2011/041754 | 4/2011 |

OTHER PUBLICATIONS

Nokia Siemens Networks, et al., "Reporting of HNB System Information," 3GPP TSG-RAN WG2 Meeting #68bis, R2-100546, Jan. 2010, 5 pages.

Nokia Siemens Networks, et al., "CSG inbound mobility," 3GPP TSG-RAN WG2 Meeting #68, R2-097023, Nov. 2009, 22 pages.

Huawei, "Clarification on reporting of handover preparation information," 3GPP TSG-RAN WG2 #68, R2-096803, Nov. 2009, 4 pages.

European Patent Office Application Serial No. 12810805.7, Search Report dated May 20, 2015, 8 pages.

3rd Generation Partnership Project (3GPP), "Technical Specification Group Radio Access Network; Evolved Universal Terrestrial Radio Access (E-UTRA); Radio Resource Control (RRC); Protocol specification (Release 10)," 3GPP TS 36.331 V10.2.0, Jun. 2011, 295 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0, Jun. 2011, 194 pages.

Korean Intellectual Property Office Application Serial No. 10-2014-7000949, Office Action dated Feb. 24, 2015, 4 pages.

\* cited by examiner

METHOD FOR REPORTING IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2012/005580, filed on Jul. 13, 2012, which claims the benefit of U.S. Provisional Application Ser. No. 61/507,606, filed on Jul. 14, 2011, the contents of which are hereby incorporated by reference herein in their entirety.

BACKGROUND OF THE INVENTION

1. Field of the Invention

The present invention relates to a wireless communication system, and more particularly, to a method for reporting by a terminal in a wireless communication system and an apparatus for supporting the same.

2. Related Art $3^{rd}$ generation partnership project (3GPP) long term evolution (LTE) which is improvement of a universal mobile telecommunications system (UMTS) is introduced as 3GPP release 8. The 3GPP LTE uses orthogonal frequency division multiple access (OFDMA) in a downlink and uses single carrier-frequency division multiple access (SC-FDMA) in an uplink. Multiple input multiple output (MIMO) having maximum four antennas are adopted. In recent years, 3GPP LTE-advanced (LTE-A) which is an evolution of the 3GPP LTE has been discussed.

A closed subscriber group (CSG) allows a limited access for only a specific subscriber to be introduced to provide a service having higher quality. A base station that can provide a CSG service may be home eNodeB (HNB) and a cell providing an authorized service to CSG subscribers may be a CSG cell. In the 3GPP, a basic requirement of the CSG is disclosed in 3GPP TS 22.220 V1.0.1 (2008-12) "Service requirements for Home NodeBs and Home eNodeBs (Release 9)".

A feature of a CSG cell limitatively providing the service is illustrated even in handover to the CSG cell. Whether a user equipment (UE) is a CSG member of a corresponding cell may be problematic in performing the handover to the CSG cell. As a result, the handover to the CSG cell may be implemented by a first step in which the UE reports a cell measurement result and a second step in which the UE acquires system information from a target cell and reports the acquired system information to a service cell.

In performing two reporting steps until receiving a handover command message from the service cell, a delay time becomes too long until the handover is performed, and as a result, the quality may deteriorate. An efficient reporting method by the UE is required.

SUMMARY OF THE INVENTION

An object of the present invention is to provide a method for reporting performed by a user equipment (UE) in a wireless communication system and an apparatus for supporting the same.

In an aspect, a method for reporting in a wireless communication system is provided. The method includes receiving a measurement configuration from a serving cell, the measurement configuration including a system information report indicator indicating that system information of a measurement result report object cell is to be reported, determining whether a reporting condition is satisfied based on the measurement configuration, and transmitting a measurement report message including a measurement result of a report object cell of which the reporting condition is satisfied to the serving cell, when the reporting condition is satisfied. The measurement report message further includes system information of the report object cell.

The method may further include receiving system information report object identification information and determining whether to transmit the system information of the report object cell to the serving cell based on the system information report object identification information.

The system information of the report object cell may be included in the measurement report message, when it is determined that the system information is transmitted to the serving cell.

The system information report object identification information may indicate a specific cell identity. When the specific cell identity is a cell identity of the report object cell, it may be determined that the system information is transmitted to the serving cell.

The system information report object identification information may indicate a specific-type cell. When a cell type of the report object cell is the specific-type cell, it may be determined that the system information is transmitted to the serving cell.

The specific-type cell may be at least one of a pico cell, a femto cell, a closed subscriber group (CSG) cell, and a multimedia broadcast and multicast service (MBMS) cell.

When the report object cell is a closed subscriber group (CSG) cell, the system information may include information regarding the CSG cell.

When the report object cell is a multimedia broadcast and multicast service (MBMS) cell, the system information may include MBMS associated information provided by the report object cell.

When the report object cell is a cell that operates a low-interference radio resource, the system information may include information associated with the low-interference radio resource.

The method may further include receiving requested system information indicating information indicating a type of system information to be reported. The system information may include information of a type indicated by the requested system information indicating information.

In another aspect, a user equipment that operates in a wireless communication system, comprising a radio frequency (RF) unit transmitting and receiving a radio signal, and a processor operably connected with the RF unit. The processor is configured for receiving a measurement configuration from a serving cell, the measurement configuration including a system information report indicator indicating that system information of a measurement result report object cell is to be reported, determining whether a reporting condition is satisfied based on the measurement configuration and transmitting a measurement report message including a measurement result of a report object cell of which the reporting condition is satisfied to the serving cell, when the reporting condition is satisfied. The measurement report message further includes system information of the report object cell.

The processor may be further configured for receiving system information report object identification information and determining whether to transmit the system information of the report object cell to the serving cell based on the system information report object identification information.

According to the present invention, a UE can transmit system information to a serving cell together with a measurement result when a specific condition is satisfied. System information of a target cell is rapidly transferred to the serving cell, and as a result, the UE can more rapidly receive a handover command message. Therefore, the UE can rapidly perform handover, and as a result, communication quality of a user can be improved.

DESCRIPTION OF EXEMPLARY EMBODIMENTS

Figure 1:
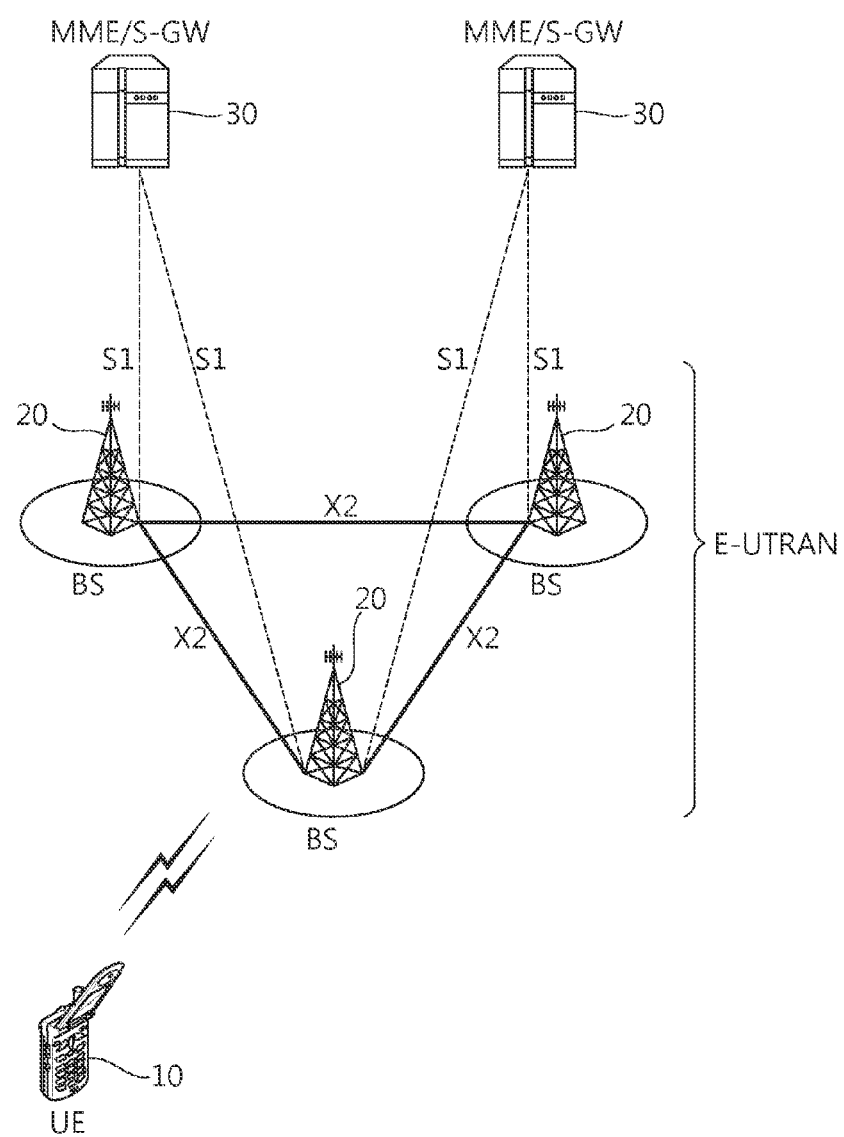
FIG. 1 illustrates a wireless communication system according to the present invention.

FIG. 1 illustrates a wireless communication system according to the present invention. The wireless communication system may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an SI-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. To this end, the RRC layer exchanges an RRC message between the UE and the base station.

Figure 2:
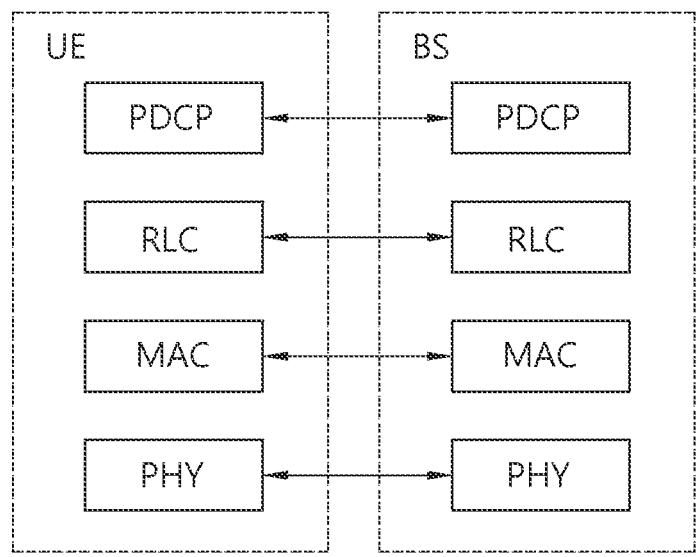
FIG. 2 is a block diagram illustrating a radio protocol architecture for a user plane.
Figure 3:
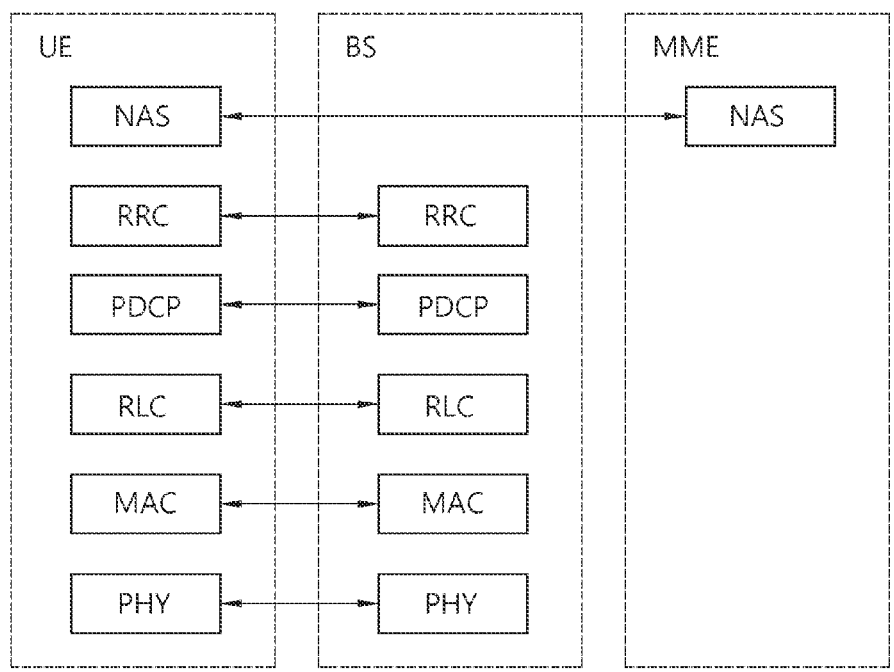
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

A function of a packet data convergence protocol (PDCP) layer on the user plane includes transferring of user data, header compression, and ciphering. A function of a packet data convergence protocol (PDCP) layer on the user plane includes transferring of control plane data and ciphering/integrity protection.

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of sub-carriers in a frequency domain. One sub-frame is constituted by the plurality of OFDM symbols in the time domain. A resource block as a resource allocation unit is constituted by the plurality of OFDM symbols and the plurality of sub-carriers. Further, each sub-frame may use specific sub-carriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer located above the RRC layer performs functions such as session management and mobility management.

In order to manage mobility of the UE on the NAS layer, two states of EPS mobility management (EMM)-REGISTERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009-09) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on a uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.
1) Limited service: The service may provide an emergency call and an earthquake and Tsunami warning system (ETWS), and provide the emergency call and the earthquake and Tsunami warning system (ETWS) in an acceptable cell.
2) Normal service: The service may mean a public use general service and may provide the public use general service in a suitable or normal cell.
3) Operator service: The service may mean a service for a communication network operator and only the communication network operator may use the cell and a general user may not use the cell.

The type of the cell may be divided as below in association with the service type provided by the cell.
1) Acceptable cell: Cell where the UE may receive the limited service. The cell is a cell that is not barred in terms of the corresponding UE and satisfies a cell selection criterion of the UE.
2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.
3) Barred cell: The cell is a cell where information indicating that the corresponding cell is a cell barred through the system information is broadcasted.
4) Reserved cell: The cell is a cell where information indicating that the corresponding cell is a cell reserved through the system information is broadcasted.

Figure 4:
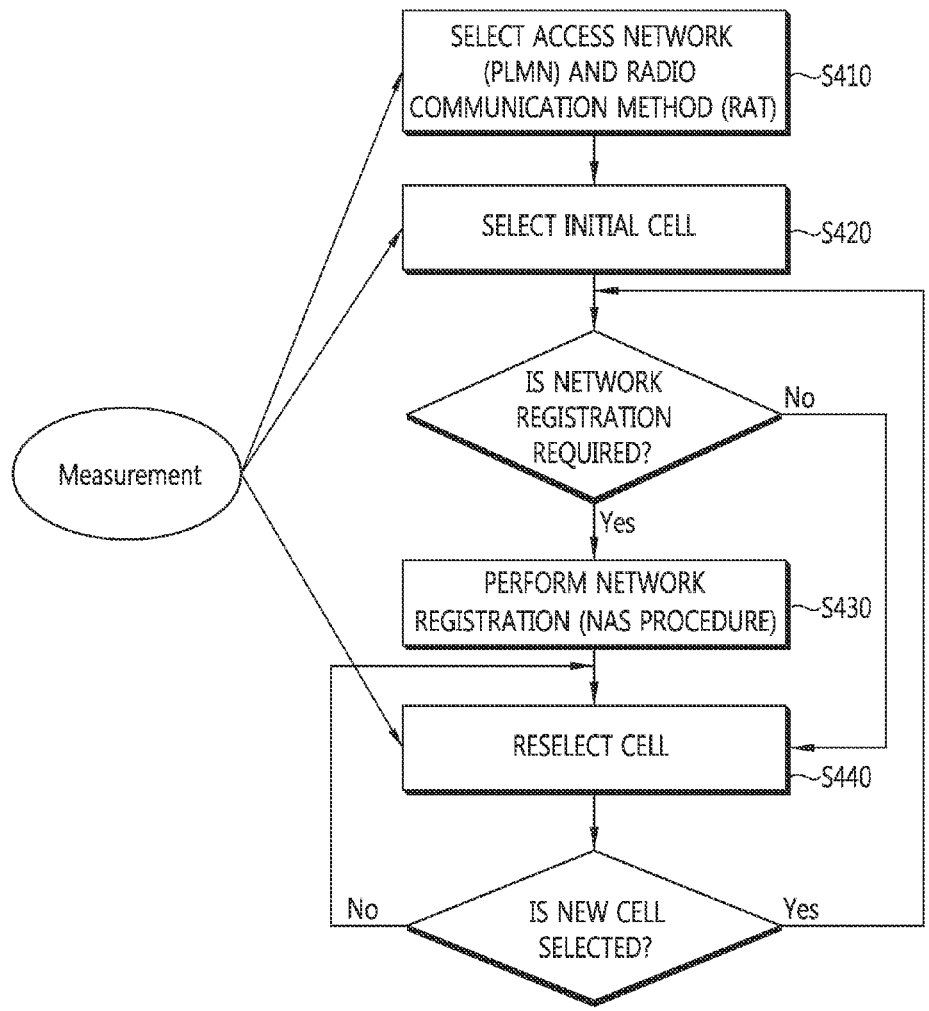
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (S430). The UE registers its own information (e.g., IMSI) in order to receive a service (e.g., paging)n from the network. The UE does not register the information in the accessed network whenever selecting the cell, and registers the information when information (e.g., a tracking area identity (TAI) of the network that receives from the system information) is different from information on a network known by the UE).

The UE performs the cell reselection based on a service environment provided by the cell or an environment of the UE (S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
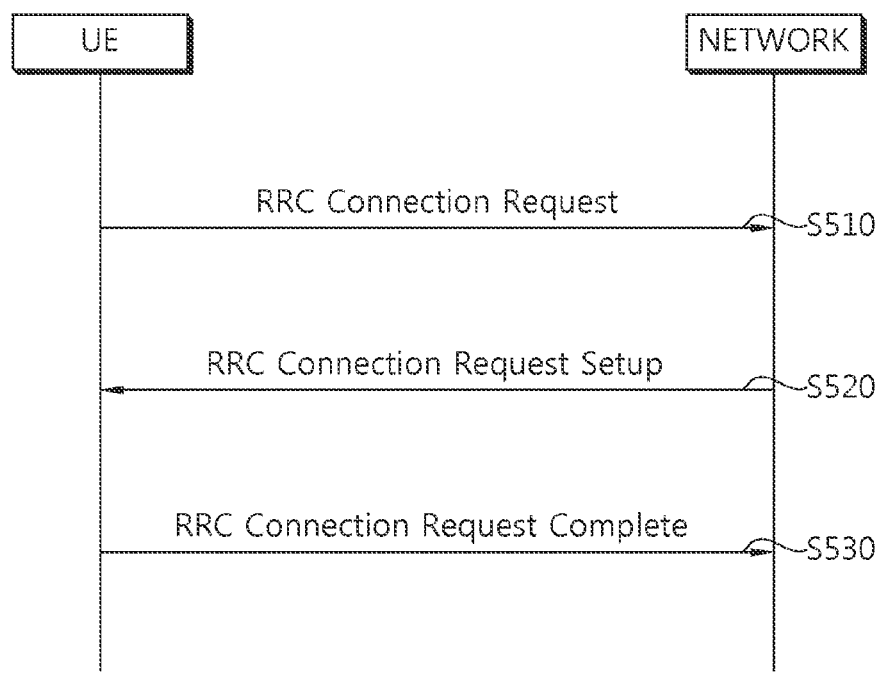
FIG. 5 is a flowchart illustrating a process of establishing an RRC connection.

FIG. 5 is a flowchart illustrating a process of establishing an RRC connection.

The UE sends to the network an RRC connection request message for requesting the RRC connection (S510). The network sends an RRC connection setup message as a response to the RRC connection request (S520). The UE enters an RRC connection mode after receiving the RRC connection setup message.

The UE sends to the network an RRC connection setup complete message used to verify successful completion of establishing the RRC connection (S530).

Figure 6:
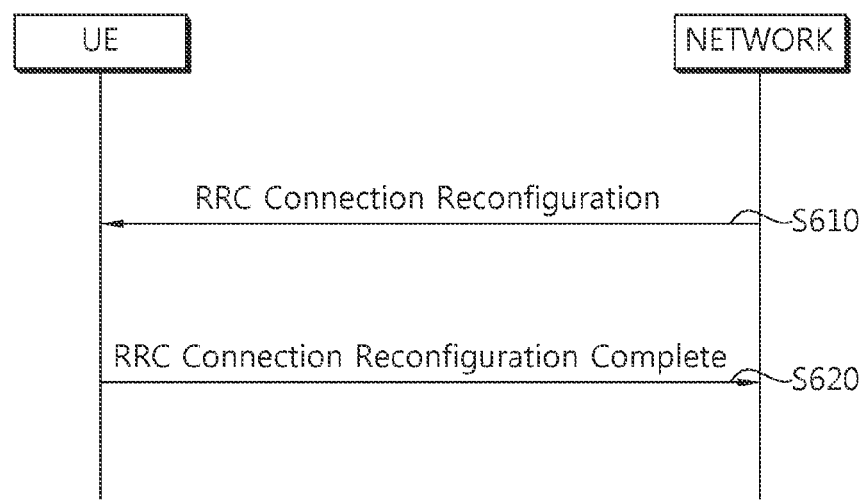
FIG. 6 is a flowchart illustrating a process of reconfiguring the RRC connection.

FIG. 6 is a flowchart illustrating a process of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (S610). The UE sends to the network an RRC connection reconfiguration complete message used to verify successful completion of establishing the RRC connection reconfiguration as a response to the RRC connection reconfiguration (S620).

Hereinafter, a radio link failure will be described.

The UE performs continuously performs measurement for the quality of a radio link with the serving cell that receives the service. The UE decides whether communication is impossible under a current situation due to deterioration in quality of the radio link with the serving cell. When the communication is almost impossible due to too low quality of the serving cell, the UE decides the current situation as a wireless connection failure.

When a radio link failure is decided, the UE abandons maintaining communication with a current serving cell, selects a new cell through the cell selection (alternatively, cell reselection) procedure, and attempts RRC connection re-establishment to a new cell.

Figure 7:
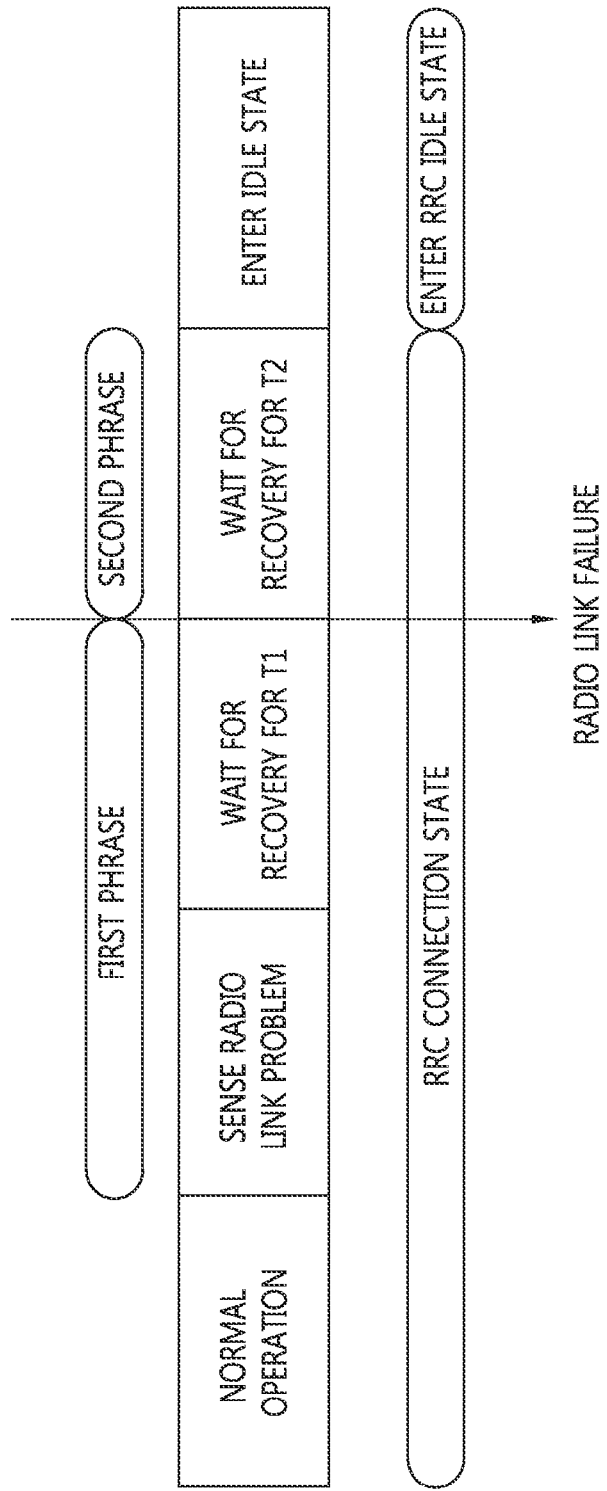
FIG. 7 is an exemplary diagram illustrating a radio link failure.

FIG. 7 is an exemplary diagram illustrating a radio link failure. An operation associated with the radio link failure may be described as two phases.

In a first phase, the UE is in a normal operation and checks whether there is a problem in a current communication link. When the problem is detected, the UE declares a radio link problem and waits for recovery of the radio link for a first stand-by time T1. When the radio link is recovered until the first stand-by time elapses, the UE performs the normal operation again. When the radio link is not recovered until the first stand-by time is expired, the UE declares the radio link failure and the UE enters a second phase.

In the second phase, the UE waits for recovering the radio link for the second stand-by time T2. When the radio is not recovered until the second stand-by time is expired, the UE enters the RRC idle state. Alternatively, the UE may perform the RRC re-establishment procedure.

The RRC connection re-establishment procedure is a procedure of re-establishing the RRC connection again in the RRC_CONNECTED state. Since the UE stays in the RRC_CONNECTED state, that is, since the UE does not enter the RRC_IDLE state, the UE does not initialize all of radio configurations (e.g., radio bearer configurations) thereof. Instead, when the UE starts the RRC connection reconfiguration procedure, the UE temporarily suspends using all of the radio bearers except for SRB0. When the RRC connection reconfiguration is succeeded, the UE resumes using the radio bearers of which the use is temporarily suspended.

Figure 8:
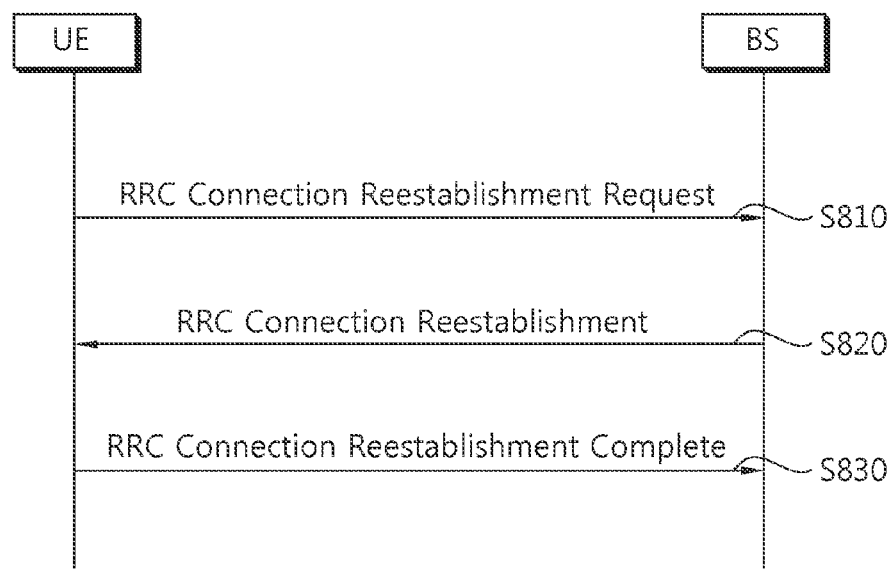
FIG. 8 is a flowchart illustrating a success in a process of reestablishing a connection.

FIG. 8 is a flowchart illustrating a success in a process of reestablishing a connection.

The UE selects a cell by performing the cell selection. The UE receives the system information in order to receive basic parameters for accessing the cell in the selected cell. In addition, the UE sends to the base station the RRC connection reestablishment request message (S810).

When the selected cell is a cell having a context of the UE, that is, a prepared cell, the base station permits the RRC connection reestablishment request of the UE and sends to the UE the RRC connection reestablishment message (S820). The UE sends to the base station the RRC connection reestablishment complete message to succeed in the RRC connection re-establishment procedure (S830).

Figure 9:
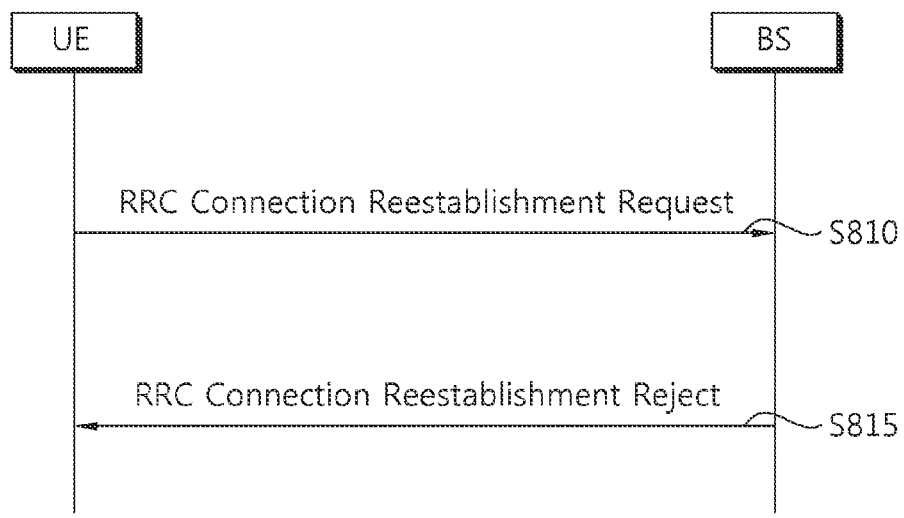
FIG. 9 is a flowchart illustrating a failure in the process of reestablishing the connection.

FIG. 9 is a flowchart illustrating a failure in the process of reestablishing the connection. The UE sends to the base station the RRC connection reestablishment request message (S810). When the selected cell is not the prepared cell, the base station sends an RRC connection re-establishment reject message to the UE as a response to the RRC connection reestablishment request (S815).

Next, a procedure in which the UE selects the cell will be described in detail.

When the power of the UE is turned on or the UE stays in the cell, the UE performs procedures for receiving the service by selecting/reselecting a cell having appropriate quality.

The UE in the RRC idle state needs to prepare for receiving the service through the cell by continuously selecting the cell having the appropriate quality. For example, the UE of which the power is just turned on needs to select the cell having the appropriate quality for registration in the network. When the UE in the RRC connection state enters the RRC idle state, the UE needs to select a cell to stay in the RRC idle state. As such, a process in which the UE selects a cell that satisfies a predetermined condition in order to stay in a service stand-by state such as the RRC idle state is referred to as the cell selection. Since the UE performs the cell selection while the cell in the RRC idle state may not be decided at present, it is important to select the cell rapidly as possible. Therefore, in the case of a cell that provides radio signal quality having a predetermined reference or more, even though the cell is not a cell that provides the best radio signal quality for the UE, the cell may be selected in the cell selection process by the UE.

Hereinafter, a method and a procedure for selecting the cell by the UE in the 3GPP LTE will be described in detail with reference to 3GPP TS 36.304 V8.5.0 (2009-03) "User Equipment (UE) procedures in idle mode (Release 8)".

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. The respective PLMNs may be identified by a mobile country code (MCC) and a mobile network code (MNC). PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service). However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

The cell selection process is generally divided into two types.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select another that provides higher quality. When the cell is again selected as such, a cell that provides higher signal quality than the currently selected cell is generally selected. The process is referred to as the cell reselection. The cell reselection process generally has a basic object o select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselect a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which in-cell UEs will commonly apply through broadcast signaling or provide a frequency-dedicated priority for each UE through UE-dedicated signaling.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, the ranking performed during the cell reselection evaluating process will be described.

A ranking criterion used to give the priority of the cell is defined as illustrated in Equation 1.

$$R_S = Q_{meas,s} + Q_{hyst}, R_n = Q_{meas,n} - Q_{offset}$$ [Equation 1]

Herein, Rs represents a ranking criterion of the serving cell, Rn represents a ranking criterion of the neighboring cell, Qmeas,s represents a quality value which the UE measures for the serving cell, Qmeas,n represents a quality value which the UE measures for a neighboring cell, Qhyst represents a hysteresis value for the ranking, and Qoffset represents an offset between two cells.

In an intra-frequency, when the UE receives an offset Qoffsets,n between the serving cell and the neighboring cell, Qffoset=Qoffsets,n and when the UE does not receive Qoffsets,n, Qoffset=0.

In an inter-frequency, when the UE receives the offset Qoffsets,n fir the corresponding cell, Qoffset=Qoffsets,n+Qfrequency and when the UE does not receive Qoffsets,n, Qoffset=Qfrequency.

When the ranking varies while the ranking criterion Rs of the serving cell and the ranking criterion of the neighboring cell Rn are similar to each other, the ranking is frequently reversed, and as a result, the UE may alternatively reselect both cells. Qhyst represents a parameter for preventing the UE from alternatively reselecting both cells by giving hysteresis in cell reselection.

The UE measures the Rs of the serving cell and the Rn of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, a measurement and a measurement report will be described.

Supporting the mobility of the UE is required in the mobile communication system. Therefore, the UE continuously measures a quality for a serving cell that provides the service at present and a quality for a neighboring cell. The UE reports a measurement result to the network at an appropriate time and the network provides optimal mobility to the UE through handover. A measurement for the object is often called a radio resource management (RPM) measurement.

The UE may perform a measurement having a specific object set by the network and report a result of the measurement to the network in order to provide information that may help an operator to operate the network in addition to the object of supporting the mobility. For example, the UE receives broadcast information of a specific cell decided by the network. The UE may report a cell identity (also referred to as a global cell identity) of the specific cell, identification information (for example, tracking area code) to which the specific cell belongs, and/or other cell information (for example, whether the specific cell is a member of the closed subscriber group (CSG) cell) to the serving cell.

When the UE which is moving verifies that a quality of a specific region is too bad through the measurement, positional information on cells having a bad quality and a measurement result may be reported to the network. The network may attempt optimization of the network based on reporting of measurement results of UEs that help operating the network.

In the mobile communication system in which a frequency reuse factor is 1, mobility is generally made among different cells in the same frequency band. Therefore, in order to well assure the mobility of the UE, the UE may well measure the qualities and cell information of the neighboring cells having the same center-frequency as the serving cell. A measurement for a cell having the same center-frequency as the serving cell as such is called an intra-frequency measurement. The UE reports a measurement result to the network at an appropriate time by performing the intra-frequency measurement to achieve an object of the corresponding measurement result.

The mobile communication operator may operate the network by using a plurality of frequency bands. When the service of the communication system is provided through the plurality of frequency bands, the UE needs to be able to measure the qualities and cell information of the neighboring cells having a different center-frequency from the serving cell for assuring the optimized mobility for the UE. A measurement for a cell having the different center-frequency as the serving cell as such is called an inter-frequency measurement. The UE needs to be able to report a measurement result to the network at an appropriate time by performing the inter-frequency measurement.

When the UE supports a measurement for heterogeneous networks, the UE may perform a measurement for cells of the heterogeneous networks by a base station configuration. The measurement for the heterogeneous networks is called an inter-radio access technology (RAT) measurement. For example, the RAT may include a UMTS terrestrial radio access network (UTRAN) and a GSM edge radio access network (GERAN) that follows a 3GPP standard specification, and may include even a CDMA 2000 system that follows a 3GPP2 standard specification.

Figure 10:
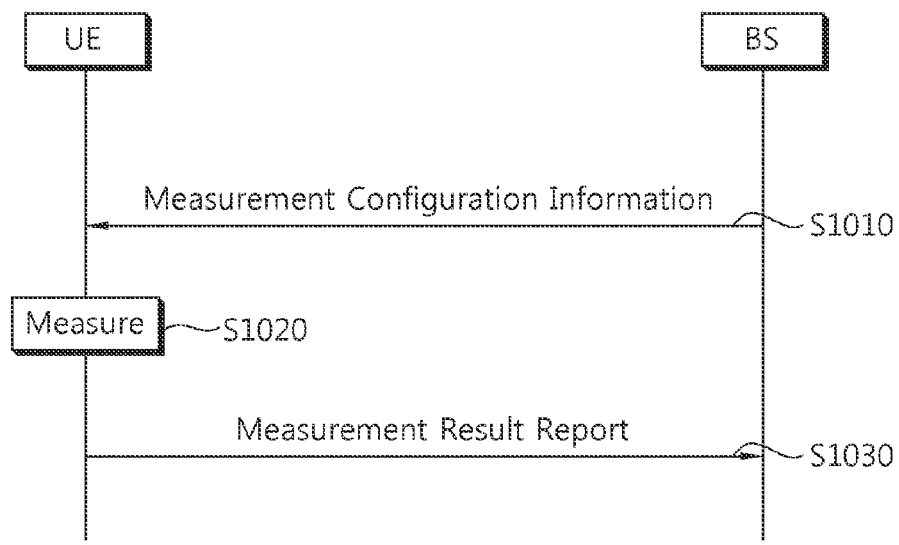
FIG. 10 is a flowchart illustrating the existing measurement performing method.

FIG. 10 is a flowchart illustrating the existing measurement performing method.

The UE receives measurement configuration information from the base station (S1010). A message including the measurement configuration information is referred to as a measurement configuration message. The UE performs a measurement based on the measurement configuration information (S1020). When a measurement result satisfies a reporting condition in the measurement configuration information, the UE reports the measurement result to the base station (S1030). A message including the measurement result is referred to as a measurement report message.

The measurement configuration information may include information described below.

(1) Measurement object information: Represents information on an object for which the UE will perform the measurement. A measurement object includes at least one among an intra-frequency measurement object which is an object of an intra-measurement, an inter-frequency measurement object which is an object of an inter-measurement, and an inter-RAT measurement object which is an object of an inter-RAT measurement. For example, the intra-frequency measurement object may indicate a neighboring cell having the same frequency band as the serving cell, the inter-frequency measurement object may indicate a neighboring cell having a different frequency band from the serving cell, and the inter-RAT measurement object may indicate a neighboring cell having different RAT from the serving cell.

(2) Reporting configuration information: Represents information on a reporting condition and a report type regarding when the UE reports the measurement result. The reporting condition may include information on an event or a cycle that triggers reporting the measurement result. The report type represents information regarding in which type the measurement result is configured.

(3) Measurement identity information: Represents information on a measurement identity to decide which measurement object, at a time when, and in which type the UE reports by associating the measurement object with the report configuration. The measurement identity information is included in the measurement report message, and as a result, it can be seen that for which measurement object the measurement result is and under which reporting condition the measurement report occurs.

(4) Quantity configuration information: Represents information on a parameter for configuring filtering a measurement unit, a report unit, and/or a measurement result value.

(5) Measurement gap information: Represents information on a measurement gap which is an interval which the UE may use for only a measurement without considering data transmission with the serving cell because downlink transmission or uplink transmission is not scheduled.

The UE has a measurement object list, a measurement report configuration list, and a measurement identity list in order to perform a measurement procedure.

In the 3GPP LTE, the base station may configure only one measurement object for one frequency band to the UE. According to Phrase 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger a measurement report illustrated in a table described below are defined.

TABLE 1

| Events | Reporting conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result by the UE satisfies the configured event, the UE transmits the measurement report message to the base station.

Figure 11:
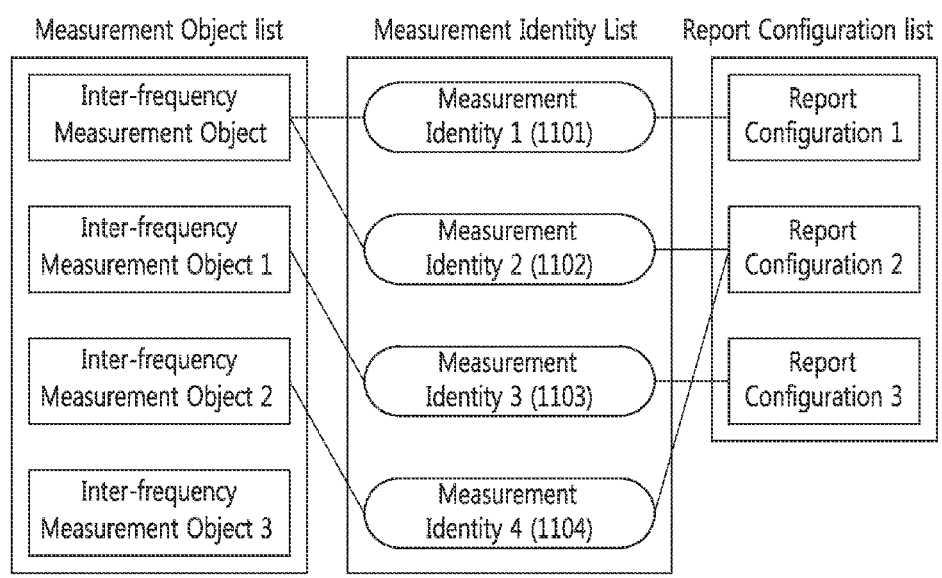
FIG. 11 illustrates one example of a measurement configuration configured for the UE.

FIG. 11 illustrates one example of a measurement configuration configured for the UE.

First, a measurement identity 1 1101 connects an intra-frequency measurement object and a report configuration 1 to each other. The UE performs an intra frequency measurement and the report configuration 1 is used to decide a criterion and a type of reporting a measurement result.

A measurement identity 2 1102 is connected with the intra-frequency measurement object similarly as the measurement identity 1 1101, but connects the intra-frequency measurement object to a report configuration 2. The UE performs the intra frequency measurement and the report configuration 2 is used to decide the criterion and the type of reporting the measurement result.

The UE transmits the measurement result even though the measurement result for the intra-frequency measurement object satisfies any one of the report configuration 1 and the report configuration 2, by the measurement identity 1 1101 and the measurement identity 2 1102.

A measurement identity 3 1103 connects an inter-frequency measurement object 1 and a report configuration 3 to each other. When a measurement result for the inter-frequency measurement object 1 satisfies the reporting condition included in the report configuration 3, the UE reports the measurement result.

A measurement identity 4 1104 connects an inter-frequency measurement object 2 and the report configuration 2 to each other. When a measurement result for the inter-frequency measurement object 2 satisfies the reporting condition included in the report configuration 2, the UE reports the measurement result.

Meanwhile, the measurement object, the report configuration, and/or the measurement identity may be added, changed, and/or deleted. The addition, the change, and/or the deletion may be instructed by sending a new measurement configuration message or sending a measurement configuration change message to the UE.

Figure 12:
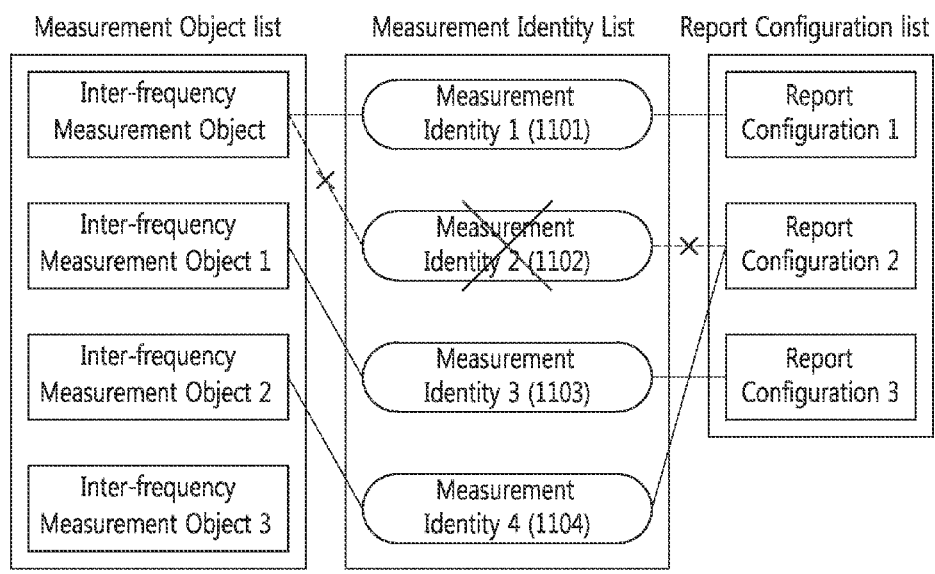
FIG. 12 illustrates an example of deleting a measurement identity.

FIG. 12 illustrates an example of deleting a measurement identity. When the measurement identity 2 1202 is deleted, a measurement for a measurement object associated with the measurement identity 2 1202 is stopped and a measurement report is not also transmitted. The measurement object or the report configuration associated with the deleted measurement identity may not be changed.

Figure 13:
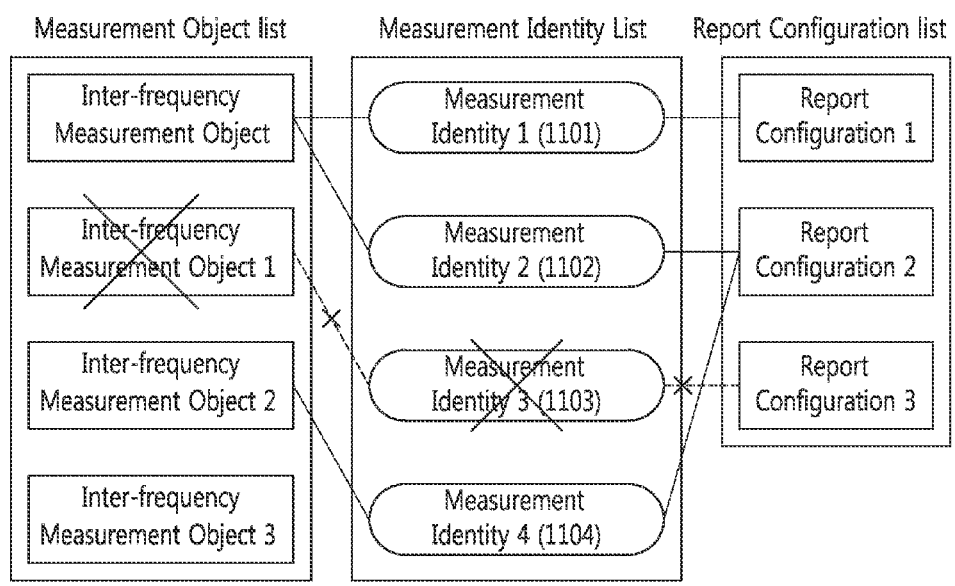
FIG. 13 illustrates an example of deleting a measurement object.

FIG. 13 illustrates an example of deleting a measurement object. When the inter-frequency measurement object 1 is deleted, the UE also deletes the associated measurement identity 3 1303. The measurement for the inter-frequency measurement object 1 is stopped and the measurement report is not also transmitted. However, the report configuration associated with the deleted first inter-frequency measurement object may not be changed or deleted.

When the report configuration is removed, the UE removes even the associated measurement identity. The UE stops measuring the associated measurement object by the associated measurement identity. However, the measurement object associated with the deleted report configuration may not be changed or deleted.

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measured quality of the neighboring cell. The measured quality may include at least one of reference signal received power (RSRP) and reference signal received quality (RSRQ).

Subsequently, H(e)NB will be described.

The mobile communication service may be provided through a person, a specific operator, or a base station possessed by a group in addition to the mobile communication network operator. The base station is called Home NB (HNB) or Home eNB (HeNB). Hereinafter, both the HNB and HeNB are collectively the HeNB. The HeNB aims at basically providing a service specialized to only a closed subscriber group (CSG). However, the service may be provided to users other than the CSG according to a configuration of an operating mode of the HeNB.

Figure 14:
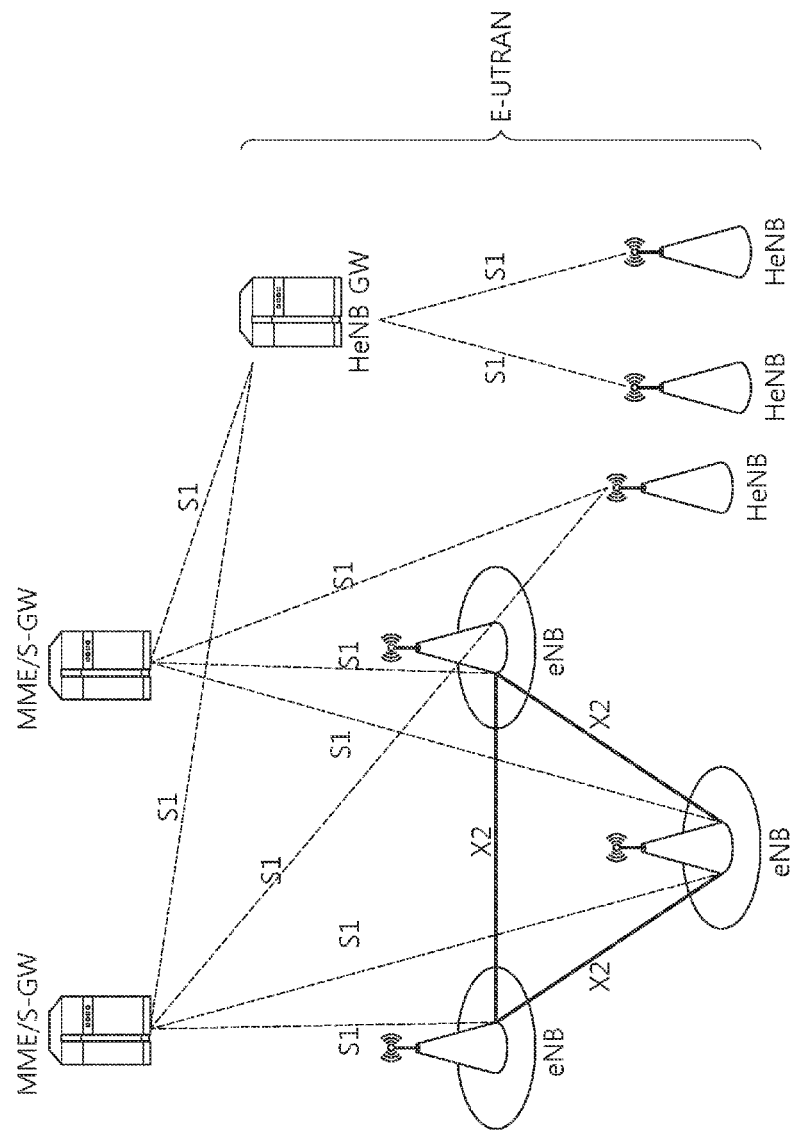
FIG. 14 is a diagram illustrating one example of a wireless communication system illustrating a HeNB operation.

FIG. 14 is a diagram illustrating one example of a wireless communication system illustrating a HeNB operation.

Referring to FIG. 14, a Home eNB gateway (HeNB GW) may be operated in order to service the HeNB as such. The HeNBs is connected to the EPC through the HeNB GW or connected directly to the EPC. The HeNB GW is seen as a general eNB for the MME. The HeNB GW is seen as the MME for the HeNB. Therefore, the HeNB and the HeNB GW are connected to each other through an S1 interface and the HeNB GW and the EPC are also connected to each other through the S1 interface. Further, even when the HeNB and the EPC are directly connected to each other, the HeNB and the EPC are connected to each other through the S1 interface. Most functions of the HeNB are similar to those of a general eNB.

In general, the HeNB is lower than an eNB possessed by the mobile communication operator in radio transmission output. Therefore, service coverage provided by the HeNB is generally smaller than that provided by the eNB. Due to such a feature, a cell provided by the HeNB is often classified as a femto cell as compared with a macro cell provided by the eNB in terms of the service coverage. Meanwhile, in terms of the provided service, when the HeNB provides the service to only the CSG, the cell provided by the HeNB is called a CSG cell.

Each CSG has its own unique identification number and the identification number is called a CSG identity (ID). The UE may have a list of the CSG to which the UE belongs as a member and the CSG list may be changed by a request from the UE or a command of the network. In general, one HeNB may support one CSG.

The HeNB transfers a CSG ID of a CSG supported thereby through the system information to be accessed by only the member UE of the corresponding CSG. When the UE discovers the CSG cell, the UE may verify which CSG the CSG cell supports by reading the CSG ID included in the system information. The UE that reads the CSG ID regards the corresponding cell as a cell capable of access only when the UE itself is a member of the corresponding CSG cell.

Even the HeNB need not permit only the CSG UE to access itself. The HeNB may also permit a UE which is not the CSG member to access itself according to a configuration of the HeNB. Which UE the HeNB permits to access itself depends on the configuration of the HeNB and herein, the configuration means a configuration of an operating mode of the HeNB. The operating mode of the HeNB is divided into three types described below by considering which UE the HeNB provides the service to.

Closed access mode: Represents a mode to provide the service to a specific CSG member. The HeNB provides the CSG cell.

Open access mode: Represents a mode to provide the service without a limitation of the specific CSG member like a general eNB. The HeNB provides not the CSG cell but the general cell.

Hybrid access mode: Represents a mode to provide a CSG service to the specific CSG member and provide the service to even a non-CSG member like the general cell. Recognized as the CSG cell by the CSG member UE and recognized as the general cell by the non-CSG member UE. Such a cell is called a hybrid cell.

The HeNB notifies whether a cell serviced thereby is the CSG cell or the general cell to the UE to allow the UE to know whether the UE may access the corresponding cell. The HeNB operated in the closed access mode broadcasts that the HeNB itself is the CSG cell through the system information. The HeNB operated in the open access mode broadcasts that the HeNB itself is not the CSG cell through the system information. As such, the HeNB encapsulates a 1-bit CSG indicator indicating whether the cell serviced thereby is the CSG cell in the system information. For example, the HeNB broadcasts that the serviced cell is the CSG cell by setting the CSG indicator as TRUE. If the serviced cell is not the CSG cell, the CSG indicator may be set as FALSE or a method that skips transmitting the CSG indicator may be used. Since the UE needs to be able to distinguish the general cell provided by the eNB from the CSG cell, the general eNB also transmit the CSG indicator to allow the UE to know that the cell type provided thereby is the general cell. The general eNB does not transmit the CSG indicator to allow the UE to know that the cell type provided thereby is the general cell. Table 2 illustrates a CSG associated parameter transmitted in a corresponding cell for each cell type. Subsequently, Table 3 illustrates a type of a UE that permits the access for each cell type.

TABLE 2

|  | CSG cell | General cell |
|---|---|---|
| CSG indicator | Indicating 'CSG cell' | Indicating 'Non-CSG cell' or not transmitted |
| CSG identity | Transmitting supported CSG identity | Not transmitted |

TABLE 3

|  | CSG cell | General cell |
| --- | --- | --- |
| UE not supporting CSG | Inaccessible | Accessible |
| Non-CSG member UE | Inaccessible | Accessible |
| Member CSG UE | Accessible | Accessible |

Hereinafter, inter-cell interference coordination (ICIC) will be described.

The ICIC is a task that operates a radio resource so that a control of inter-cell interference is maintained. An ICIC mechanism may be divided into frequency-domain ICIC and time-domain ICIC. The ICIC has a multi-cell radio resource management (RRM) function to require considering information from multiple cells.

An interfering cell is a cell that provides interference. The interfering cell is also referred as an aggressor cell.

An interfered cell is a cell that is interfered by the interfering cell. The interfered cell is also referred to as a victim cell.

The frequency-domain ICIC coordinates the use of a frequency-domain resource (e.g., a resource block (RB)) among the multiple cells.

The time-domain ICIC coordinates a time-domain resource (e.g., a subframe) among the multiple cells. An operations, administration, and maintenance (OAM) configuration called an almost blank subframe (ABS) pattern may be used for the time-domain ICIC. An ABS in the interfering cell is used to protect a resource in the subframe in the interfered cell that receives interference among strong cells. The ABS is a subframe that has reduced transmission power (alternatively, zero transmission power) on the physical channel or has reduced activity.

A pattern based on the ABS is notified to the UE and restricts a UE measurement. This restriction is referred to as a measurement resource restriction. The ABS pattern represents information indicating which subframe is the ABS in one or more radio frames.

There are provided three measurement resource restriction patterns according to a measured cell (e.g., a serving cell or a neighbor cell) and measurement types (e.g., a radio resource management (RRM), a radio link measurement (RLM), and channel state information (CSI)).

'ABS pattern 1' is used in an RRM/RLM measurement resource restriction of the serving cell. The base station may notify information on ABS pattern 1 to the UE in configuration/modification/release of the RB or when MAC/PHY configuration is modified.

'ABS pattern 2' is used in an RRM measurement resource restriction of the neighbor cell that operates at the same frequency as the serving cell. Therefore, a list of neighbor cells to be measured in addition to information on ABS pattern 2 may be provided to the UE. ABS pattern 2 may be included in a measurement configuration for a measurement object.

'ABS pattern 3' is used in a resource restriction for a CSI measurement of the serving cell. ABS pattern 3 may be included in a message for configuring a CSI report.

Two scenarios of a CSG scenario and a pico scenario are considered for the ICIC.

Figure 15:
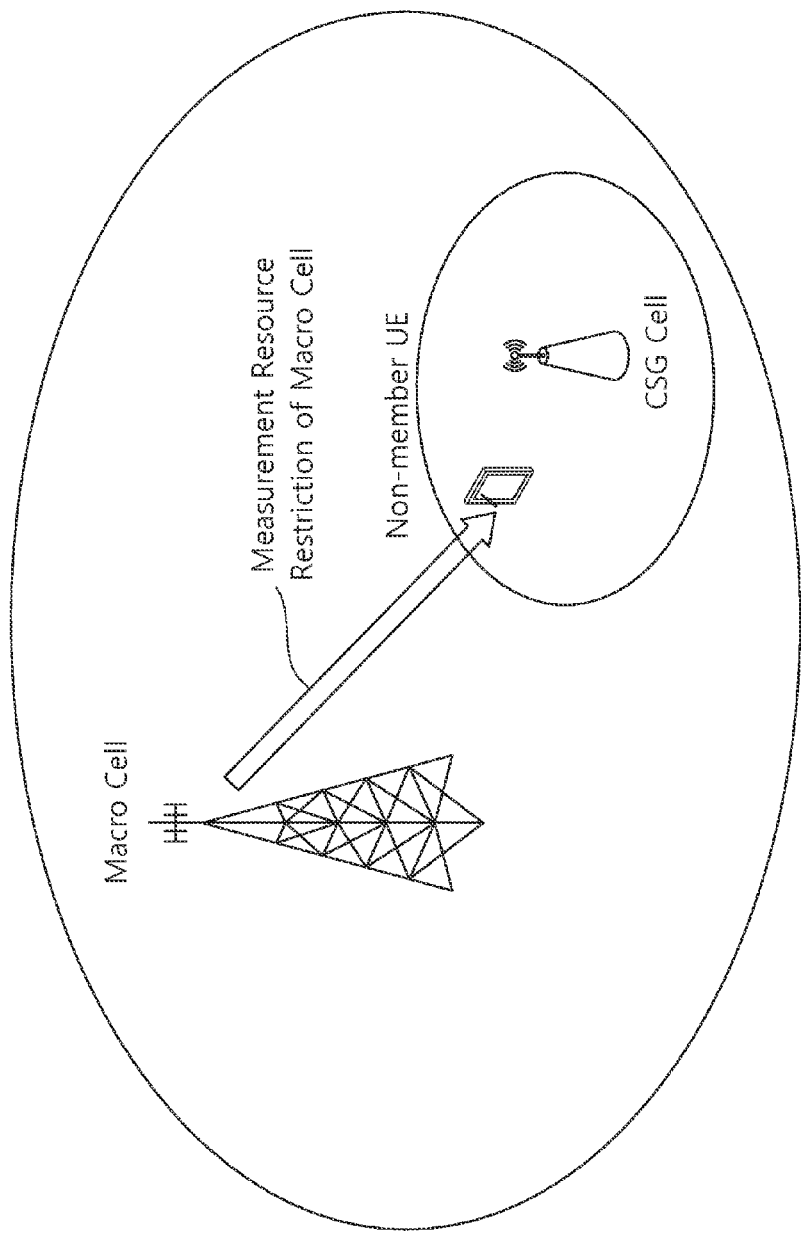
FIG. 15 exemplifies a CSG scenario.

FIG. 15 exemplifies a CSG scenario.

The CSG cell represents a cell accessible by only a specific subscriber. The non-member UE as a UE which is not the member of the CSG cell is UE that does not access the CSG cell. The CSG cell which the UE may not access is referred to as the non-member CSG cell. The macro cell represents the serving cell of the non-member UE. Coverage of the CSG cell and coverage of the macro cell are partially or fully duplicated with each other.

A primary interference condition occurs when the non-member UE is positioned in close proximity with the CSG cell. In terms of the non-member UE, the interfering cell becomes the CSG cell and the macro cell becomes the interfered cell. The time-domain ICIC is used so as for the non-member UE to continuously receive the service in the macro cell.

In the RRC connection state, when the network discovers that the non-member UE belongs to strong interference from the CSG cell, the network may configure a measurement resource restriction. Further, in order to facilitate mobility from the macro cell, the network may configure an RRM measurement resource restriction for the neighbor cell. When the UE is not strongly interfered from the CSG cell any longer, the network may release the RRM/RLM/CSI measurement resource restriction.

The UE may use the measurement resource restrictions configured for the RRM, RLM, and CSI measurement. That is, a resource for the RLM may be used in the ABS, and the measurement for the RLM and the CSI measurement may be performed in the ABS.

The network may configure the CSG cell not to use a low-interference radio resource depending on the configured measurement resource restriction. That is, the CSG cell may not transmit or receive data in the ABS.

Figure 16:
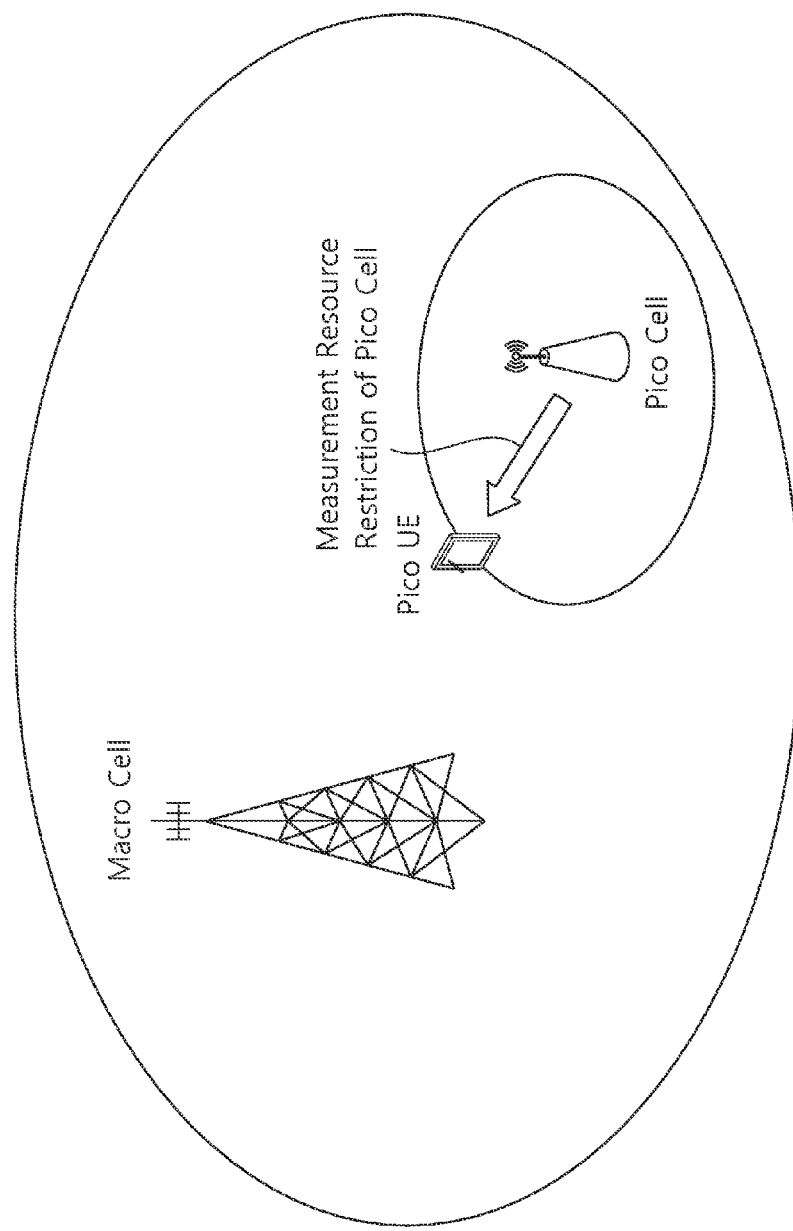
FIG. 16 exemplifies a pico scenario.

FIG. 16 exemplifies a pico scenario.

A pico cell is a serving cell of a pico UE. The pico cell is a cell of which coverage is partially or fully duplicated with the coverage of the macro cell. The pico cell may generally have smaller coverage than the macro cell, but the present invention is not particularly limited thereto.

The primary interference condition occurs when the pico UE is positioned at an edge of the pico serving cell. In terms of the pico UE, the interfering cell becomes the macro cell and the pico cell becomes the interfered cell. The time-domain ICIC is used so as for the pico UE to continuously receive the service in the pico cell.

When the pico cell discovers that the pico UE is strongly interfered from the macro cell, the pico cell may configure the measurement resource restriction for the corresponding UE.

The pico UE may use the measurement resource restrictions configured for the RRM, RLM, and CSI measurement. That is, the resource for the RLM may be used in the ABS, and the measurement for the RLM and the CSI measurement may be performed in the ABS. When the pico cell is strongly interfered from the macro cell, a more accurate measurement is possible in the case where the RRM/RLM/CSI measurement is performed in the ABS.

Further, when the UE in the macro cell as the serving cell performs the measurement for the neighbor cell in the ABS, mobility from the macro cell to the pico cell may be facilitated.

The UE performs the RRM measurement such as the reference signal received power (RSRP) and the reference signal received quality (RSRQ), a measurement of quality such as a channel quality indicator (CQI), and a path-loss measurement for the serving cell or the neighbor cell. Further, the UE may perform a measurement for radio link monitoring (RLM) for monitoring a connection with the serving cell.

The interfering cell and the interfered cell are decided depending on an object which the UE intends to measure.

When the UE intends to measure the serving cell, an intra-frequency neighbor cell having a high signal strength near the UE may act as interference in a measurement for the serving cell. In this case, the UE may undergo strong interference by the neighbor cell in the measurement for the serving cell.

When the UE intends to measure the intra-frequency neighbor cell, serving cell and other intra-frequency neighbor cell signals may act as the interference for the measurement of the intra-frequency neighbor cell. In this case, the UE may undergo strong interference by the serving cell and other neighbor cells of a serving frequency in the measurement of the neighbor cell.

When the serving cell may know information on a measurement resource restriction which the neighbor cell causing the UE to be interfered applies for suppressing the interference, the interfered UE may perform a limited measurement based on the measurement resource restriction. The serving cell may provide the service the UE through scheduling primarily using a low-interference radio resource in spite of the interference by the neighbor cell.

A multimedia broadcast/multicast service (MBMS) is a service to provide multimedia data to the UE in the cell. An MCH channel which is a transmission channel for the MBMS may be mapped to the MCCH or the MTCH which is the logical channel. The MCCH transmits an RRC message associated with the MBMS and the MTCH transmits traffic of a specific MBMS.

A plurality of MCHs may be used according to capacities of the MTCH and the MCCH in one cell. The MCH is in charge of transmitting two logical channels of the MTCH and the MCCH, and is again mapped to a physical multicast channel (PMCH) which is the physical channel.

One MCCH is present in one MBMS single frequency network (MBSFN) region transmitting the same MBMS information/traffic, and when a plurality of MBSFN regions are provided in one cell, the UE may receive a plurality of MCCHs. When the MBMS associated RRC message is changed in a specific MCCH channel, the PDCCH transmits an MBMS radio network temporary identity (M_RNTI) and an indicator indicating the specific MCCH.

A UE that supports the MBMS receives the M-RNTI and the MCCH indicator through the PDCCH to determine that the MBMS associated RRC message is changed in the specific MCCH and receive the specific MCCH. The RRC message of the MCCH may be changed every change cycle and is repeatedly broadcasted every repetition cycle.

The existing wireless network may calculate the number of UEs that receives a specific service through a counting procedure. The counting procedure is configured in such a manner that the UE transmits an uplink counting response message when the wireless network transmits a downlink counting request message.

Meanwhile, in specific handover, the UE needs to read system information of a handover target cell and report the read system information to the serving cell during preparing for the handover. In other words, a first reporting step of reporting a target cell measurement value depending on a measurement configuration transmitted from the serving cell and a second reporting step of acquiring and reporting the system information of the target cell are required to be performed. This is described in a reporting method for a handover procedure to the CSG cell.

Figure 17:
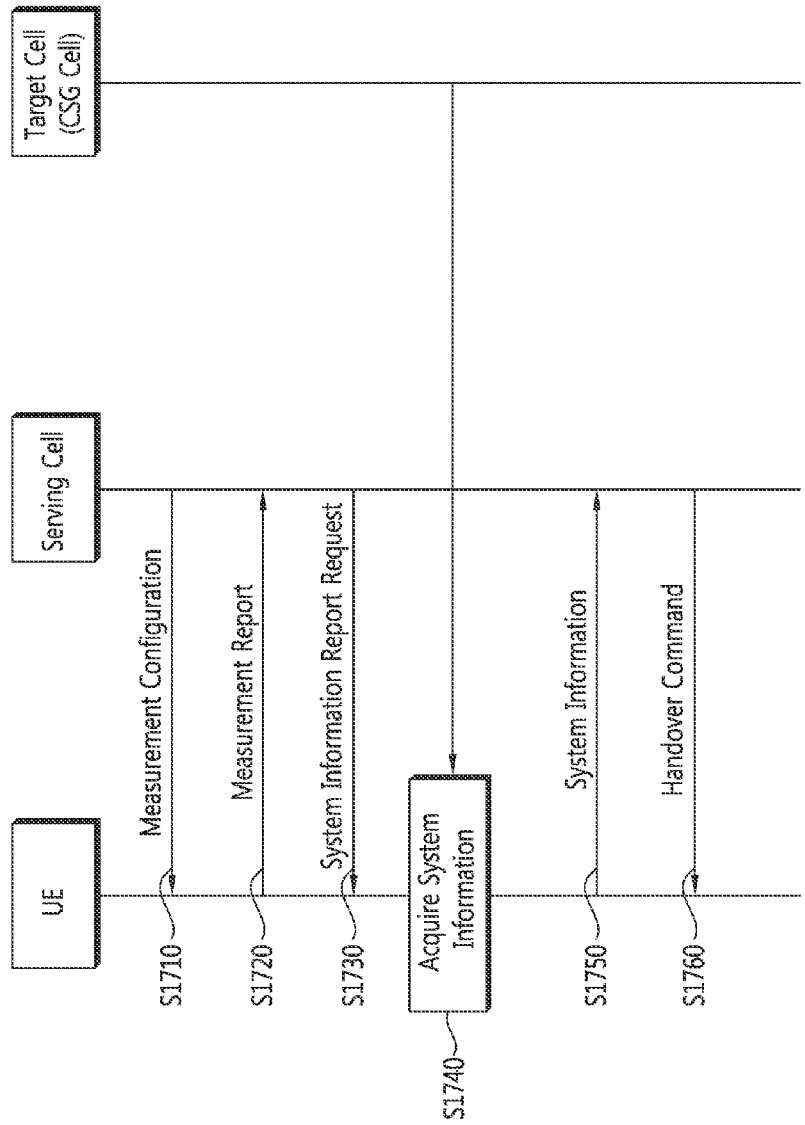
FIG. 17 is a diagram illustrating one example of a method for reporting for handover to a CSG cell.

FIG. 17 is a diagram illustrating one example of a method for reporting for handover to a CSG cell.

Referring to FIG. 17, the UE receives a measurement configuration for reporting cell quality from the serving cell (S1710).

The UE performs the measurement based on the measurement configuration and reports to the serving cell a measurement report including the cell quality measurement value of the target cell when a reporting condition is satisfied. A physical cell ID (PCI) of the target cell may be included in the measurement report.

The serving cell requests reporting the system information of the target cell to the UE (S1730). System information which the serving cell requests acquiring to the UE may be all or some of system information which the target cell broadcasts.

The UE enters the target cell and acquires the system information (S1740). The UE reports the acquired system information of the target cell to the serving cell (S1750). The system information of the target cell which the UE reports to the serving cell may include the cell global ID (CGI), the CSG ID, and an indicator indicating whether the UE is the CSG member of the corresponding CSG cell.

The serving cell transmits a handover command message to the UE when it is determined that the target cell is suitable as a handover object of the UE (S1760).

In FIG. 17, S1710 which is the step in which the UE receives the measurement configuration for measuring the quality of the target cell and S1720 which is the step of measuring the quality of the target cell based on the received measurement configuration and reporting the measured quality to the serving cell may be referred to as a first measurement step. Further, S1730 which is the step in which the system information of the target cell is requested to be acquired from the serving cell, S1740 which is the step of acquiring the system information of the target cell according to the request, and S1750 which is the step of reporting the acquired system information to the serving cell may be referred to as a second measurement step. That is, receiving and reporting the system information may be additionally performed after the step in which the UE measures the quality of the handover target cell and reports the measured quality. As a result, a delay time is lengthened until the UE receives a handover command and the resulting communication quality may deteriorate.

In order to solve the problem which may occur as above, there is proposed a reporting method in which the UE includes system information of a specific cell in the measurement report message in addition to a measurement result of the specific cell and transmits the measurement report message. To this end, the serving cell may include a system information report indicator indicating the system information to be included in the measurement result at the time of reporting the measurement result in the measurement configuration, in transmitting the measurement configuration to the UE. When the UE acquires the system information from the specific cell and stores the acquired system information, the UE may transmit the system information to the serving cell together with the measurement result when a specific condition is satisfied.

Figure 18:
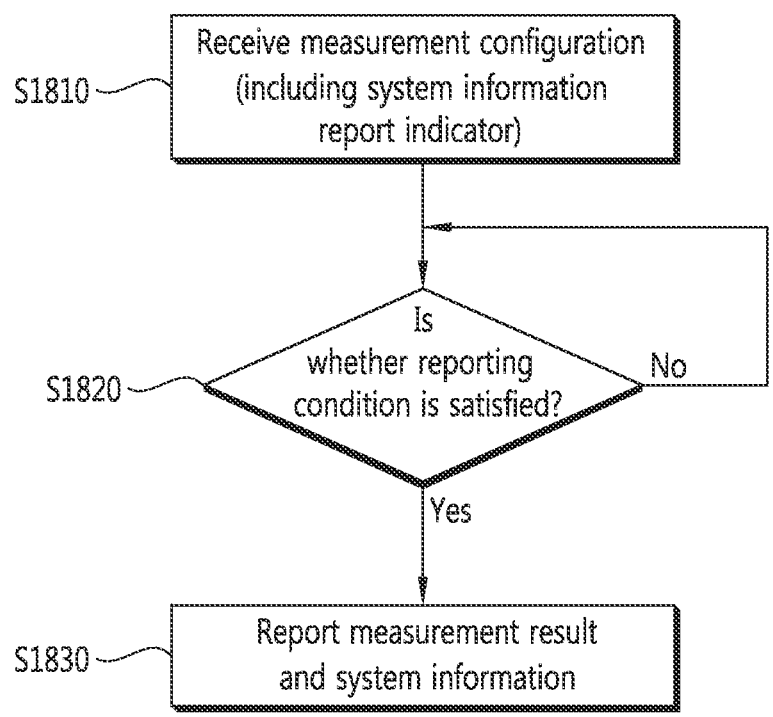
FIG. 18 is a detailed flowchart illustrating one example of a method for reporting according to an embodiment of the present invention.

FIG. 18 is a detailed flowchart illustrating one example of a method for reporting according to an embodiment of the present invention.

Referring to FIG. 18, the UE receives the measurement configuration from the serving cell (S1810). The measurement configuration may include system information report indicator. The UE may determine to report the system information of the corresponding cell together at the time of reporting the measurement result through the system information report indicator. The system information report indicator may be included in a measurement object configuration and/or a measurement report configuration of the measurement configuration.

The UE determines whether the reporting condition is satisfied (S1820). The UE may consistently determine whether the reporting condition is satisfied by continuously measuring the measurement object when the reporting condition is not satisfied.

The UE may report the measurement result of the cell and the system information of the corresponding cell to the serving cell when the reporting condition is satisfied (S1830).

In case that the system information report indicator is included in the measurement object configuration, when the measurement reporting condition associated with the measurement object including the system information report indicator is satisfied, the UE may include the measurement result of the cell, which satisfies the reporting condition, and the system information of the cell in the measurement report message for reporting the measurement and transmit the message to the serving cell. When a plurality of cells satisfy the reporting condition, system information of the plurality of cells may be together transmitted if the system information of the corresponding cell is already acquired. On the contrary, the UE may include system information of one specific cell and transmit it. The UE may select a cell having the highest quality based on the signal quality in selecting one specific cell, include system information of the corresponding cell and transmit it.

In case that the system information report indicator is included in the measurement report configuration, when the measurement reporting condition associated with the measurement report configuration including the system information report indicator is satisfied, the UE may include the measurement result and the system information of the cell of which the reporting condition is satisfied in the measurement report message for reporting the measurement and transmit the message to the serving cell.

The serving cell may provide information for the UE to identify a specific cell of which the system information can be reported together with the measurement report. The serving cell may transmit the system information report indicator and the system information report object information in the measurement configuration. The UE may selectively report the system information for a specific cell to the serving cell based on the system information report object information. Hereinafter, it will be described in more detail with reference to FIG. 19.

Figure 19:
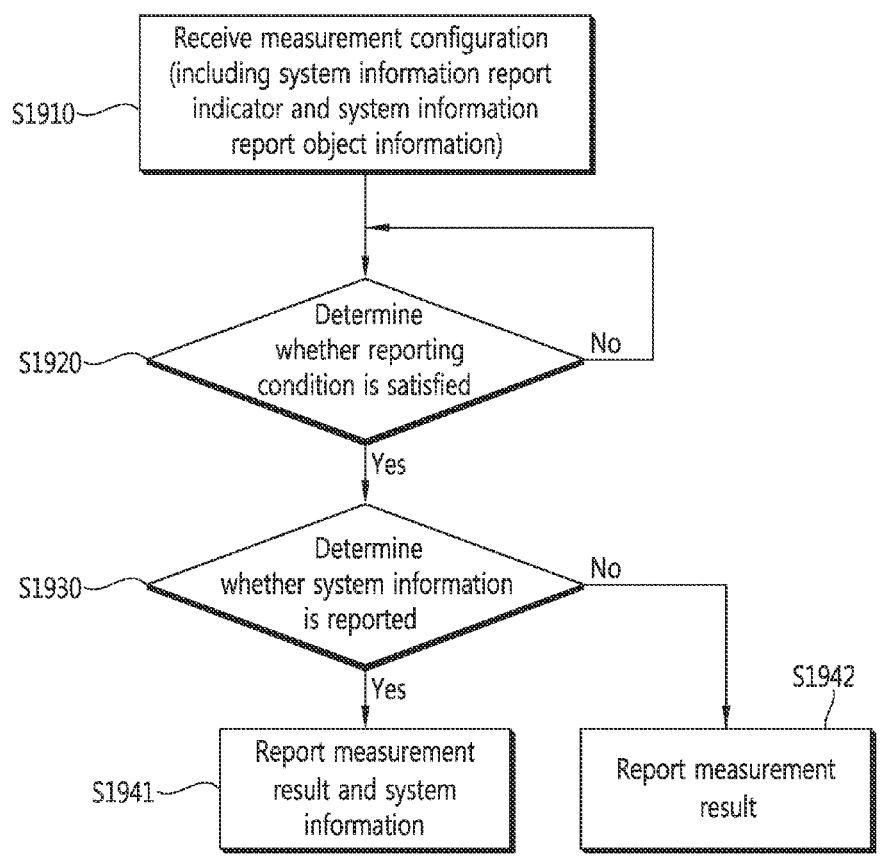
FIG. 19 is a detailed flowchart illustrating another example of the method for reporting according to the embodiment of the present invention.

FIG. 19 is a detailed flowchart illustrating another example of the method for reporting according to the embodiment of the present invention.

Referring to FIG. 19, the UE receives the measurement configuration from the serving cell (S1910). The measurement configuration may include the system information report indicator and the system information report object information. The UE that receives the system information report indicator may determine whether to report the system information of the specific cell through the system information report object information. The system information report indicator and the system information report object information may be included in the measurement object configuration and/or the measurement report configuration.

The UE determines whether the reporting condition is satisfied (S1920). The UE may consistently determine whether the reporting condition is satisfied by continuously measuring the measurement object when the reporting condition is not satisfied.

When the reporting condition is satisfied, the UE determines whether to report the system information of the cell of which the reporting condition is satisfied (S1930).

In the case where the system information report object information is included in the measurement object configuration, the UE may include the measurement result and the system information of the corresponding cell in the measurement report message and transmit the message to the serving cell if the reporting condition associated with the measurement object including the system information report object information is satisfied and the cell satisfying the reporting condition is an object of the system information report according to the system report object information (S1941). If the cell that satisfies the reporting condition is not the object of the system information report according to the system report object information, the UE may include the measurement result in the measurement report message without the system information of the corresponding cell and transmit the message to the serving cell (S1942).

In the case where the system information report object information is included in the measurement report configuration, the UE may include the measurement result and the system information of the corresponding cell in the measurement report message and transmit the message to the serving cell if the reporting condition of the measurement object associated with the measurement report configuration including the system information report object information is satisfied and the cell satisfying the reporting condition is an object of the system information report according to the system report object information (S1941). If the cell that satisfies the reporting condition is not the object of the system information report according to the system report object information, the UE may include the measurement result in the measurement report message without the system information of the corresponding cell and transmit the message to the serving cell (S1942).

In the examples of the reporting method of FIGS. 18 and 19, the reporting condition may be an event based reporting condition. The reporting condition may be a periodic reporting condition. The reporting condition may be an event based periodic reporting condition.

In the aforementioned example of the reporting method of FIG. 19, the system information report object information may specify a specific cell as described below.

A cell having one specific identity or a plurality of cell identities designated by the network;

A cell included in a range of the cell identity designated by the network;

A specific-type cell designated by the network. The specific-type cell may be a specific type classified according to the size of the cell. In this case, the specific type may be a pico cell and/or a femto cell. The specific-type cell may be a cell specified by considering whether a specific service is provided. In this case, the cell may be a cell in which the MBMS is possible or a cell in which the MBMS is impossible. In this case, the cell may be the CSG cell.

A cell included in an area designated by the network. The area may be an area which may be distinguished through the tracking area code (TAC). The area may be an area which may be distinguished through the PLMN. The area may be an area which may be distinguished through geo-location information.

When the UE determines to include the measurement result regarding the system information of the corresponding cell in the measurement result report message regarding the quality of the neighbor cell and the UE needs to additionally include the system information received directly from the corresponding cell, the UE may be allowed to use an autonomous gap for autonomously deciding a time interval to disregard the connection with the serving cell for measuring the neighbor cell.

In the aforementioned example of the reporting method, the system information which the UE includes in the measurement report message may include information described below.

When the specific cell associated with the system information is a cell that supports the CSG, the reported system information may include CSG associated information such as the CSG ID and the CSG indicator of the specific cell.

When the specific cell associated with the system information is a cell that supports the MBMS, the reported system information may include MBMS associated information such as MBMS information, MBMS configuration information, MBMS scheduling information, MBMS providing frequency information, and/or MBSFN subframe information of the specific cell.

When the specific cell associated with the system information is a cell in which the measurement resource restriction is configured, the reported system information may include ABS pattern information of the specific cell, low-interference subframe pattern information, or low-interference radio resource associated information such as a limited measurement pattern.

The reported system information may include access restriction associated information such as an access class barring parameter.

The reported system information may be frequency band information of one or more uplinks associated with a downlink of the specific cell.

In the reporting method which is described in detail with reference to FIGS. 18 and 19, the serving cell may indicate the UE to report specific information in the system information of the reporting target cell. To this end, the serving cell may transmit system information indication information requested to the UE to the UE. The requested system information indication information is included in the measurement configuration to be transmitted. The requested system information indication information may be included in the measurement object configuration and/or the measurement report configuration. The requested system information may be configured to instruct the CSG associated information, the MBMS associated information, the low-interference radio resource associated information, the access restriction associated information, and the frequency band information of one or more uplinks associated with the downlink of the specific cell to be reported. The requested system information may be implemented by including the parameter indicating each information in the measurement configuration.

In the reporting method according to the embodiment of the present invention in FIGS. 18 and 19, the UE may further include specific information judged/processed based on the acquired system information in the measurement report message and transmit the message at the time of reporting the measurement result and the system information to the serving cell.

The specific information may include information indicating whether the UE regarding the measurement result report object cell is the CSG member.

The specific information may include information indicating whether the UE accesses the measurement result report object cell.

The specific information may include information indicating whether to receive a specific service desired by the UE in the measurement result report object cell. As one example, the specific information may include information indicating whether the UE may receive the MBMS information in the cell.

The specific information may be information indicating whether the UE may be subjected to a specific radio resource configuration in the measurement result report object cell. For example, the specific information may be information indicating whether the UE may camp on in the cell. The specific information may be information indicating whether the cell is a suitable cell for the UE. The specific information may be information indicating whether the cell is a cell used as the serving cell through carrier aggregation or system information required to configure the cell as the serving cell through the carrier aggregation.

Figure 20:
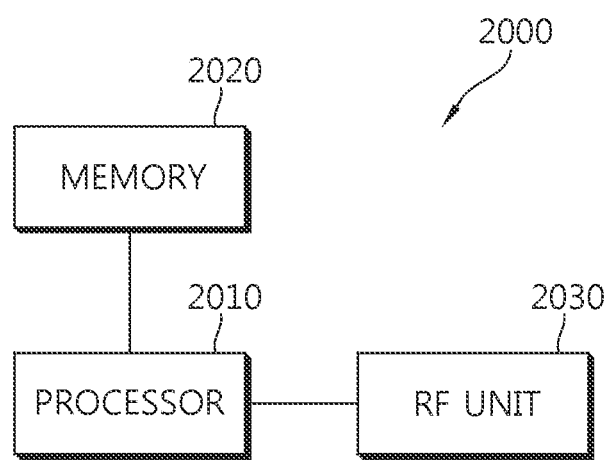
FIG. 20 is a block diagram illustrating a wireless apparatus which may be implemented by the embodiment of the present invention.

FIG. 20 is a block diagram illustrating a wireless apparatus which may be implemented by the embodiment of the present invention. A UE and/or a base station that performs the reporting method according to the embodiment of FIGS. 18 and 19 may be implemented by the apparatus.

A wireless apparatus 2000 includes a processor 2010, a memory 2020, and a radio frequency unit (RF unit) 2030. The processor 2010 implements a function, a process, and/or a method which are proposed. The processor 2010 receives the measurement configuration to determine whether the reporting condition is satisfied. The processor 2010 determines whether to report the system information of the report object cell together with the measurement result when the reporting condition is satisfied. The processor 2010 may be implemented to report specific system information in the acquired system information. The processor 2010 may be configured to implement the embodiment of the present invention with reference to FIGS. 18 and 19.

The RF unit 2030 is connected with the processor 2010 to transmit and/or receive a radio signal.

The processor 2010 may include an application-specific integrated circuit (ASIC), another chip set, a logic circuit and/or a data processing apparatus. The memory 2020 may include a read-only memory (ROM), a random access memory (RAM), a flash memory, a memory card, a storage medium, and/or another storage device. The RF unit 2030 may include a baseband circuit for processing the radio signal. When the embodiment is implemented by software, the aforementioned technique may be implemented by a module (a process, a function, and the like) that performs the aforementioned function. The module may be stored in the memory 2020 and executed by the processor 2010. The memory 2020 may be provided inside or outside the processors 110 and 210 and connected with the processor 2020 by various well-known means.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for reporting in a wireless communication system, comprising:
   receiving a measurement configuration from a serving cell and system information report object identification information, the measurement configuration including a system information report indicator indicating that system information of a measurement result report object cell is to be reported;
   determining whether a reporting condition is satisfied based on the measurement configuration;

determining whether to transmit system information of a report object cell to the serving cell based on the system information report object identification information; and transmitting a measurement report message including a measurement result of the report object cell of which the reporting condition is satisfied to the serving cell, when the reporting condition is satisfied, wherein the measurement report message includes the system information of the report object cell when it is determined that the system information is transmitted to the serving cell.

2. The method of claim 1, wherein:
the measurement report message does not include the system information of the report object cell when it is determined that the system information is not transmitted to the serving cell.

3. The method of claim 1, wherein:
the system information report object identification information indicates a specific cell identity, and
when the specific cell identity is a cell identity of the report object cell, it is determined that the system information is transmitted to the serving cell.

4. The method of claim 1, wherein:
the system information report object identification information indicates a specific-type cell, and
when a cell type of the report object cell is the specific-type cell, it is determined that the system information is transmitted to the serving cell.

5. The method of claim 4, wherein:
the specific-type cell is at least one of a pico cell, a femto cell, a closed subscriber group (CSG) cell, and a multimedia broadcast and multicast service (MBMS) cell.

6. The method of claim 1, wherein:
when the report object cell is a closed subscriber group (CSG) cell, the system information includes information regarding the CSG cell.

7. The method of claim 1, wherein:
when the report object cell is a multimedia broadcast and multicast service (MBMS) cell, the system information includes MBMS associated information provided by the report object cell.

8. The method of claim 1, wherein:
when the report object cell is a cell that operates a low-interference radio resource, the system information includes information associated with the low-interference radio resource.

9. The method of claim 1, further comprising:
receiving requested system information indicating information indicating a type of system information to be reported,
wherein the system information includes information of a type indicated by the requested system information indicating information.

10. A user equipment that operates in a wireless communication system, comprising:
a radio frequency (RF) unit transmitting and receiving a radio signal; and
a processor operably connected with the RF unit, wherein the processor is configured for:
receiving a measurement configuration from a serving cell and system information report object identification information, the measurement configuration including a system information report indicator indicating that system information of a measurement result report object cell is to be reported;

determining whether a reporting condition is satisfied based on the measurement configuration;

determining whether to transmit system information of a report object cell to the serving cell based on the system information report object identification information; and transmitting a measurement report message including a measurement result of the report object cell of which the reporting condition is satisfied to the serving cell, when the reporting condition is satisfied, wherein the measurement report message includes system information of the report object cell when it is determined that the system information is transmitted to the serving cell.

11. The UE of claim 10, wherein:
the measurement report message does not include the system information of the report object cell when it is determined that the system information is not transmitted to the serving cell.

12. The UE of claim 10, wherein:
the system information report object identification information indicates a specific cell identity, and
when the specific cell identity is a cell identity of the report object cell, it is determined that the system information is transmitted to the serving cell.

13. The UE of claim 10, wherein:
the system information report object identification information indicates a specific-type cell, and
when a cell type of the report object cell is the specific-type cell, it is determined that the system information is transmitted to the serving cell.

14. The UE of claim 13, wherein:
the specific-type cell is at least one of a pico cell, a femto cell, a closed subscriber group (CSG) cell, and a multimedia broadcast and multicast service (MBMS) cell.

15. The UE of claim 10, wherein:
when the report object cell is a closed subscriber group (CSG) cell, the system information includes information regarding the CSG cell.

16. The UE of claim 10, wherein:
when the report object cell is a multimedia broadcast and multicast service (MBMS) cell, the system information includes MBMS associated information provided by the report object cell.

17. The UE of claim 10, wherein:
when the report object cell is a cell that operates a low-interference radio resource, the system information includes information associated with the low-interference radio resource.

18. The UE of claim 10,
wherein the processor is further configured to receive requested system information indicating information indicating a type of system information to be reported, and
wherein the system information includes information of a type indicated by the requested system information indicating information.

* * * * *